H. L. Bennett,
Feed Regulator.
No. 95,973.          Patented Oct. 19, 1869.
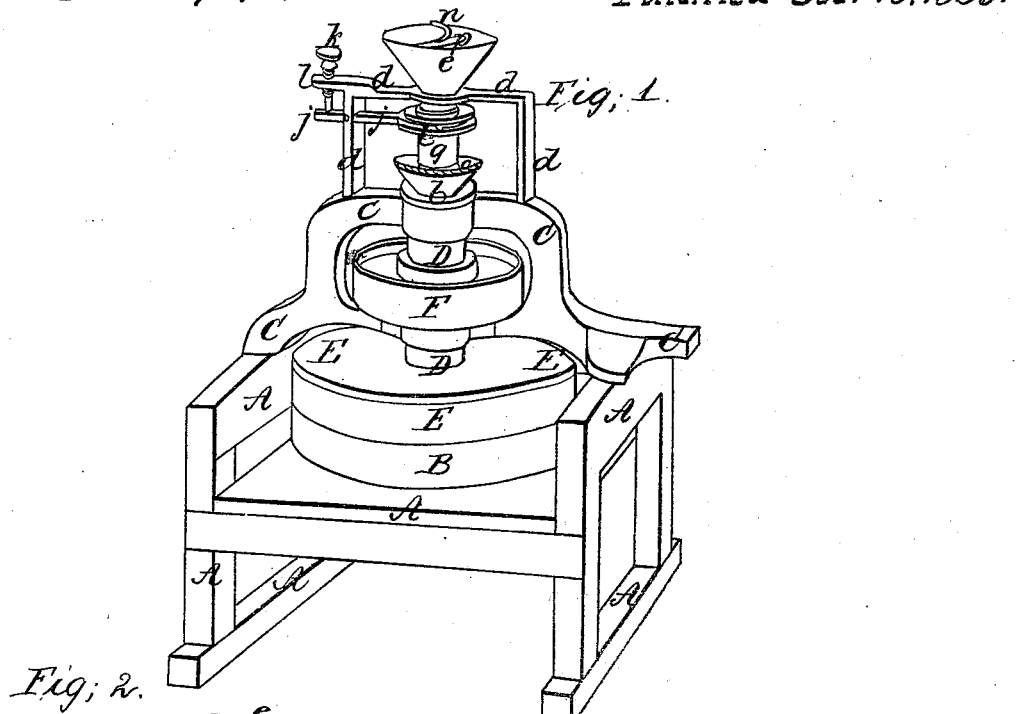
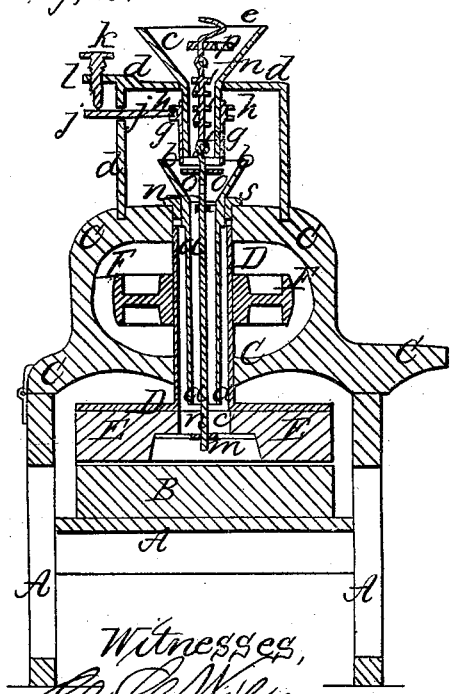
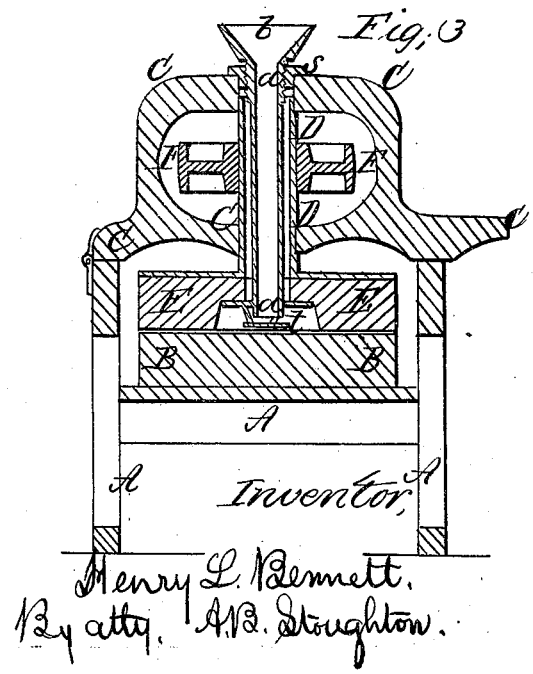
Witnesses
C. C. Wilson
Edmund Masson
Inventor
Henry L. Bennett
By atty. A. B. Stoughton.

United States Patent Office.

HENRY L. BENNETT, OF GENEVA, ILLINOIS.

Letters Patent No. 95,973, dated October 19, 1869.

IMPROVED FEED-MECHANISM FOR GRINDING-MILLS.

The Schedule referred to in these Letters Patent and making part of the same.

*To all whom it may concern:*

Be it known that I, HENRY L. BENNETT, of Geneva, in the county of Kane, and State of Illinois, have invented certain new and useful Improvements in the Feed-Mechanism of Grinding-Mills; and I do hereby declare the following to be a full, clear, and exact description of the construction and operation of the same, reference being had to the accompanying drawings, making a part of this specification, in which—

Figure 1 represents in perspective the application of the feed in question to a pair of millstones or a mill; and Figure 2 represents a vertical section through the same.

Figure 3 represents a vertical section through a modified form of feed-adjustment, application to the same construction otherwise, as shown in fig. 2.

Similar letters of reference, where they occur in the separate figures, denote like parts in all of the drawings.

My invention consists in the manner in which I have arranged the exterior and interior feeding-tubes, and the adjusting-mechanism connected therewith, in connection with a runner-stone, suspended from the hollow spindle, so that grain and other material to be ground may be regulated and fed to the stones through said inner tube, as will be explained.

To enable those skilled in the art to make and use my invention, I will proceed to describe the same with reference to the drawings.

A represents a frame, upon which is placed a bed-stone, B.

To this frame A is hinged, or otherwise attached, a solid and strong cast-iron frame, C, in which the hollow spindle D, to which the upper stone or runner E is attached, is supported and revolves.

A pulley, F, is placed on the spindle D, by which and a band passing around it, the spindle and runner are driven.

Within the hollow spindle D, there is a tube, *a*, which has a funnel-shaped top, *b*, and which latter tube extends to or into the eye *c* of the runner E.

On top of the cast-iron frame C is mounted a small frame, *d*, in which is supported a hopper or funnel, *e*, the tube *f* of which extends down to or into the funnel or hopper *b*.

Around the tube *f* of the upper hopper there is a sleeve or boss, *g*, which has a grooved collar, *h*, upon it, into which the forks *i* of an arm, *j*, take, said arm passing through the frame *d*, where it is pivoted, and beyond said frame, so that a set-screw, *k*, passing through a fixed portion, *l*, of the frame *d*, may bear upon said hinged arm, and press it down, or allow it to raise, which movements at that end of said pivoted arm correspondingly raises or lowers the sleeve or boss *g*, at its other or opposite end.

A bail or bridge-tree, *m*, is arranged in the runner, from which a rod, *n*, connected to the bail, extends up through the interior tube *a*, and has upon it, just below the sleeve or boss *g*, a disk, *o*, of sufficient size to close or nearly so the opening through said boss or sleeve, when they come in contact with each other; and where this rod *n* passes through the tube *f* of the upper hopper *e*, it is furnished with arms or stirrers, 1 1 1, to prevent the material that is to be fed through to the stones from clogging; and the upper end of this rod may be supported in a cross-piece, *p*, in said hopper, so that however this rod and its arms or stirrers run or revolve with the runner-stone E.

For feeding middlings, feed-stuff, corn, and such like, this top-feeding mechanism is more peculiarly adaptable.

For feeding wheat, an under or lower feed or regulator is better, as follows:

The tube *a*, in the modification shown in fig. 3, has a screw-thread, *r*, upon it, at or near its upper end, which runs in another thread cut in the top *s* of the exterior tube D, or in a nut over said top, and the edge of the hopper *b* may be milled or otherwise, so as to be caught and turned, to raise or lower it in the exterior tube D.

Underneath the tube *a*, there is a disk or plate, *t*, fixed in the runner E, toward or from which the tube *a* is moved by its screw, to diminish or enlarge its exit opening, and thus regulate the amount of grain that can pass through it, in substantially the same way as by the raising or lowering of the tube or boss *g*, in regard to the disk *o*, by the screw *k* in fig. 3.

The same kind of upper hopper *e*, and stirrers and rod as are shown in fig. 2, may be used, with the plan shown in fig. 3, though the stirrers may be at the bottom, or top and bottom both, if found essential, though wheat in good condition is not so apt to clog as middlings, feed-stuff, or corn.

The runner E, being suspended from the spindle D, and driven by it from above, would, under ordinary circumstances, be difficult to remove for redressing or facing it, but by hinging the frame C, which carries and supports both runner and spindle, they may be turned over, so that the face of the runner is uppermost, in which position it can be redressed without detaching it or the spindle from their frame.

Having thus fully described my invention,

What I claim therein as new, and desire to secure by Letters Patent, is—

In combination with the runner of a pair of grinding-stones or burrs, which is suspended to or by a hollow spindle, supported and driven from above said runner, a feed-mechanism, arranged and operating in connection with said hollow spindle, substantially as herein described and represented, and for the purpose set forth.

HENRY L. BENNETT.

Witnesses:
 JOEL L. COX,
 CHAS. D. BENNETT.